United States Patent [19]
Van Eijck et al.

[11] Patent Number: 5,450,248
[45] Date of Patent: Sep. 12, 1995

[54] SYSTEM, APPARATUS AND METHODS FOR RECORDING AND/OR REPRODUCING ON AND/OR FROM A RE-RECORDABLE RECORD CARRIER DIGITAL SIGNALS CONTAINING INFORMATION WHICH RESULTS IN CONCEALMENT DURING REPRODUCTION

[75] Inventors: Gustavus L. P. Van Eijck; Gerardus C. P. Lokhoff; Franciscus A. Kneepkens; John F. Sherry, all of Eindhoven, Netherlands

[73] Assignee: U.S. Philips Corporation, New York, N.Y.

[21] Appl. No.: 49,740

[22] Filed: Apr. 19, 1993

[30] Foreign Application Priority Data

Jun. 9, 1992 [EP] European Pat. Off. ........... 92201653

[51] Int. Cl.$^6$ .......................... G11B 5/00; G11B 5/09
[52] U.S. Cl. ........................................ 360/32; 360/40
[58] Field of Search .................... 360/32, 48, 46, 51, 360/53, 49, 40

[56] References Cited

U.S. PATENT DOCUMENTS

| | | | |
|---|---|---|---|
| 4,362,295 | 8/1983 | Tanaka et al. | 360/48 |
| 4,620,311 | 10/1986 | Immink . | |
| 4,799,113 | 1/1989 | Murakami | 360/32 |
| 4,896,362 | 1/1990 | Veldhuis et al. | 381/30 |
| 4,939,598 | 7/1990 | Kulakowski et al. | 360/48 |
| 5,065,389 | 11/1991 | Roth | 369/48 |
| 5,097,364 | 3/1992 | Goto et al. | 360/32 |

(List continued on next page.)

FOREIGN PATENT DOCUMENTS

| | | |
|---|---|---|
| 402973 | 5/1990 | European Pat. Off. . |
| 457390 | 5/1990 | European Pat. Off. . |
| 457391 | 5/1990 | European Pat. Off. . |
| 0400755 | 12/1990 | European Pat. Off. ............ 369/58 |
| 9100285 | 5/1990 | Netherlands . |
| 9100173 | 9/1992 | Netherlands ......................... 360/51 |

OTHER PUBLICATIONS

IEEE ICASSP 80, vol. 1, 327–331, Apr. 9–11, 1980, M. A. Krasner, "The Critical Band Coder ... Digital Encoding of Speech Signals Based On Perpetual Requirements of The Auditory System".

(List continued on next page.)

*Primary Examiner*—Donald Hajec
*Assistant Examiner*—Thien Minh Le
*Attorney, Agent, or Firm*—Richard A. Weiss

[57] ABSTRACT

Systems, apparatus and methods for recording or reproducing from a re-recordable record carrier digital signals, representing a digital audio signal, containing information which results in concealment of a portion of a replica of the digital audio signal during its reproduction to prohibit audio distortions resulting from a boundary between two digital signals, wherein one of those digital signal is newly-recorded over a previously-recorded other digital signal. The concealment information can also be included in auxiliary signals recorded on reproduced from the record carrier along with the digital signals. In a recording apparatus, a digital signal including audio information (i.e., data-reduced samples of sub-band signals derived from sub-band coding a digital audio signal, and bit allocation information and scale factor information relating to the quantized samples) is provided with, via a signal processing unit, mutilated information or a concealment code (possibly included in an auxiliary signal instead) indicating that a portion of the replica of the digital audio signal is to be concealed during its reproduction, and then, recorded on a re-recordable record carrier. The reproducing apparatus acts, via a concealment control signal and a concealment unit, as a result of the mutilated information or the concealment code included in a digital signal (or auxiliary signal) read or received from a re-recordable record carrier, to conceal a portion of the replica of the digital audio signal during its reproduction. In embodiments in which concealment codes are used, a detector is included in the reproducing apparatus to detect the concealment code.

52 Claims, 7 Drawing Sheets

U.S. PATENT DOCUMENTS

| | | | |
|---|---|---|---|
| 5,117,313 | 5/1992 | Lokhoff et al. | 360/40 |
| 5,151,830 | 9/1992 | Goto et al. | 360/32 |
| 5,214,678 | 5/1993 | Rault et al. | 375/122 |
| 5,233,482 | 8/1993 | Galbraith et al. | 360/46 |
| 5,243,470 | 9/1993 | Duurland et al. | 360/15 |
| 5,247,396 | 9/1993 | Nagai et al. | 360/32 X |
| 5,267,098 | 11/1993 | Lokhoff | 360/50 |
| 5,274,772 | 12/1993 | Duner et al. | 360/48 |
| 5,323,396 | 6/1994 | Lokhoff | 360/46 |
| 5,365,553 | 11/1994 | Velduis et al. | 360/46 |
| 5,367,608 | 11/1994 | Velduis et al. | 360/46 |

OTHER PUBLICATIONS

694324, U.S. Appln. (Corr. to EP Appln. 457,391) May 1, 1991.

020188 U.S. Appln. (Corr. to EP Appln. 457, 390) Feb. 16, 1993.

669136 U.S. Appln. (Corr. to EP Appln. 448,160) Mar. 13, 1991.

703216 U.S. Appln. (Corr. to Dutch Appl. 9100285) May 20, 1991.

686327 U.S. Appln. (Corr. to EP Appln. 456,299) Apr. 16, 1991.

997158 U.S. Appln. (Corr. to EP Appln. 402,973) Dec. 21, 1992.

M. A. Krasner, "The Critical Band Coder . . . Digital Encoding of Speech Signals Based On Perceptual Requirements of The Auditory System", IEEE ICASSP 80, vol. 1, pp. 327–331, Apr. 9–11, 1980.

SYSTEM, APPARATUS AND METHODS FOR RECORDING AND/OR REPRODUCING ON AND/OR FROM A RE-RECORDABLE RECORD CARRIER DIGITAL SIGNALS CONTAINING INFORMATION WHICH RESULTS IN CONCEALMENT DURING REPRODUCTION

BACKGROUND OF THE INVENTION

The invention relates to systems for recording and reproducing digital audio signals on and from a re-recordable record carrier. Such systems comprise a recording apparatus for recording a digital audio signal in a track on the record carrier and a reproducing apparatus for reproducing a digital audio signal from the track of the record carrier substantially corresponding to the digital audio signal recorded therein.

The recording apparatus comprises: (a) an input terminal for receiving a digital audio signal; (b) a first conversion unit for converting the digital audio signal in a data reduction step into a second digital signal comprising synchronization information and audio information, i.e., bit allocation information, scale factor information and samples of sub-band signals derived from the digital audio signal, included in subsequent frames of the second digital signal; (c) a second conversion unit for converting the second digital signal into a third digital signal which is error correction encoded, and (d) a write unit for writing the third digital signal in a track on the record carrier.

The reproducing apparatus comprises: (a) a read unit for reading a replicated third digital signal substantially corresponding to the third digital signal from the track on the record carrier; (b) a first deconversion unit for (i) correcting errors in the replicated third digital signal (ii) generating an error-flag if it is not capable of correcting an error, and (iii) reconverting the replicated third digital signal into a replicated second digital signal which substantially corresponds to the second digital signal; (c) a second deconversion unit for converting the replicated second digital signal into a replica of the digital audio signal; (d) a concealment unit for concealing uncorrectable errors in the replica of the digital audio signal in response to error flags generated by the first deconversion unit; and (e) an output terminal for supplying the replica of the digital audio signal. The invention also relates to recording apparatus and methods and reproducing apparatus for use in the systems. In addition, the invention relates to re-recordable record carriers obtained with the recording methods.

A system in accordance with the systems of the opening paragraphs is described in Dutch Patent Application No. 91.00.285, which corresponds to U.S. patent application No. 07/827,789, filed Jan. 1, 1992. That patent application describes a system including a recording apparatus and a reproducing apparatus of the DCC type, which enable audio signals in digital form to be recorded and reproduced on and from a magnetic record carrier incorporated in a compact cassette like housing. The audio signal reproduced has substantially a CD quality.

SUMMARY OF THE INVENTION

The present invention enables a further improvement of the system described in Dutch Patent Application No. 91.00.285. The invention makes it possible to re-record a new recording partly over a terminal portion of an earlier recording such that, during reproduction of the earlier recording and the new recording, the probability of occurrence of an audible distortion as a result of the reproduction of the boundary between the earlier recording and the new recording is significantly decreased.

For that purpose, a system in accordance with the opening paragraphs is characterized in that the recording apparatus further comprises a signal processing unit for further processing a digital signal in the recording apparatus in response to the switching of the recording apparatus into a recording mode so as to ensure that mutilate information is included in a start portion of the third digital signal which is recorded in the track. The information included in the start portion of the third digital signal is mutilated such that, during reproduction, the mutilated information included in the start portion of the replicated third digital signal read from the track results in generating a concealment control signal during a first time interval which is applied to the concealment unit so as to conceal a portion of the replica of the digital audio signal during the first time interval. The first time interval lasts at least as long as the portion of the replica of the digital audio signal (derived from the start portion of the replicated third digital signal).

As an alternative, a system in accordance with the opening paragraphs is characterized in that the recording apparatus further comprises a signal processing unit for processing a digital signal in the recording apparatus in response to and directly preceding the termination of a recording mode so as to mutilate information included in a terminal portion of the third digital signal which is recorded in the track. The information included in the terminal portion is mutilated such that, during reproduction, the mutilated information included in the terminal portion of the replicated third digital signal read from the track results in generating a concealment control signal during a second time interval which is applied to the concealment unit so as to conceal a portion of the replica of the digital audio signal during the second time interval. The second time interval lasts at least as long as the portion of the replica of the digital audio signal (derived from the terminal portion of the replicated third digital signal).

The two embodiments just described can be applied separately or in combination.

The invention is based on the recognition that, during reproduction, the start portion of the new recording in the replicated second digital signal need not be contiguous to the terminal portion of the remaining part of the earlier recording in the replicated second digital signal.

The terms "not contiguous" means that the boundary, in the replicated second digital signal produced from the record carrier, between the terminal portion of the earlier recording and the start portion of the new recording is not exactly located at the boundary between two subsequent complete frames in the replicated second digital signal. The first one of the two complete frames is the last frame in the replicated second digital signal of the earlier recording adjoining the boundary, and the second one of the two frames is the first complete frame in the replicated second digital signal of the new recording. The two above-mentioned portions are not contiguous if the last frame in the replicated second digital signal of the earlier recording and/or the first frame in the replicated second digital signal of the new recording are not complete. This can lead to an incorrect conversion in the first deconversion unit. As a result, an audible distortion can occur in the replica of the digital audio signal.

By mutilating, during the recording step, the information representing a start portion of the new recording such that, during reproduction, a concealment control signal is generated so as to conceal the appropriate portion of the replicated second digital signal or the replica of the digital audio signal, the probability of occurrence of audible distortions is reduced to substantially zero. Concealment of the replica of the digital audio signal can be realized in various ways: repeating previous correct signal samples or signal portions, interpolating between correct signal samples or signal portions, interpolating between correct signal samples or signal portions that are located around the signal samples or signal portions representing the start portion of the new recording or muting the signal samples or signal portions representing the start portion of the new recording, for example, by setting the signal samples to zero.

In the same way, it may be possible that the terminal portion of the earlier recording lies beyond the terminal portion of a new recording on the record carrier. This means that the terminal portion of the new recording in the replicated second digital signal is followed by the remaining part of the earlier recording in the replicated second digital signal. The boundary between both can in the same way be the cause of audible distortions in the replica of the digital audio signal. In order to preclude this, it is preferred to mutilate the information representing a terminal portion of the new recording so that, during reproduction, a concealment control signal can be generated so as to conceal the appropriate portion of the replica of the digital audio signal.

There are various possibilities to mutilate the digital signal to be recorded. The "mutilation of the digital signal" should be interpreted in a non-restrictive sense. It includes, inter alia, a scrambling of the third digital signal to be recorded. Another possibility is that parity information, normally included in the third digital signal to be recorded, is mutilated. This "mutilation of the digital signal" results in uncorrectable errors in the replicated third digital signal read from the record carrier. As a result, error flags are generated by the first deconversion unit, which activates one of the concealment methods described above. The error flags in this case form the concealment control signal, under the influence of which the concealment of the appropriate portion of the replica of the digital audio signal read out is activated.

"Mutilating the digital signal" also includes a signal processing step in which concealment codes are added to the third digital signal to be recorded. Those concealment codes can be detected by a detector in the reproducing apparatus so as to generate the concealment control signal. As a further alternative, it should be noted that the concealment codes need not necessarily be added to the third digital signal and to be recorded in the same track as the third digital signal. It is equally possible to record the concealment codes in a separate track.

Finally, reference should be made to U.S. Pat. No. 5,065,389, which describes record carriers of the write-once type which cannot be overwritten, meaning that an error in a recorded signal, such as the recording of an undesirable signal, can not be corrected. That patent proposes mutilation of the undesired signal recorded previously in a record carrier so as to generate error flags during reproduction and to activate a muting function in response thereto. Contrary to this, the present invention proposes mutilation of the start or end portion of the new recording so as to decrease the probability of occurrence of audible distortions.

BRIEF DESCRIPTION OF THE DRAWINGS

The invention will now be described in more detail with reference to the following drawings, in which FIGS. 1a and b show a prior art recording apparatus.

DESCRIPTION OF THE PREFERRED EMBODIMENTS

Figure 1A:
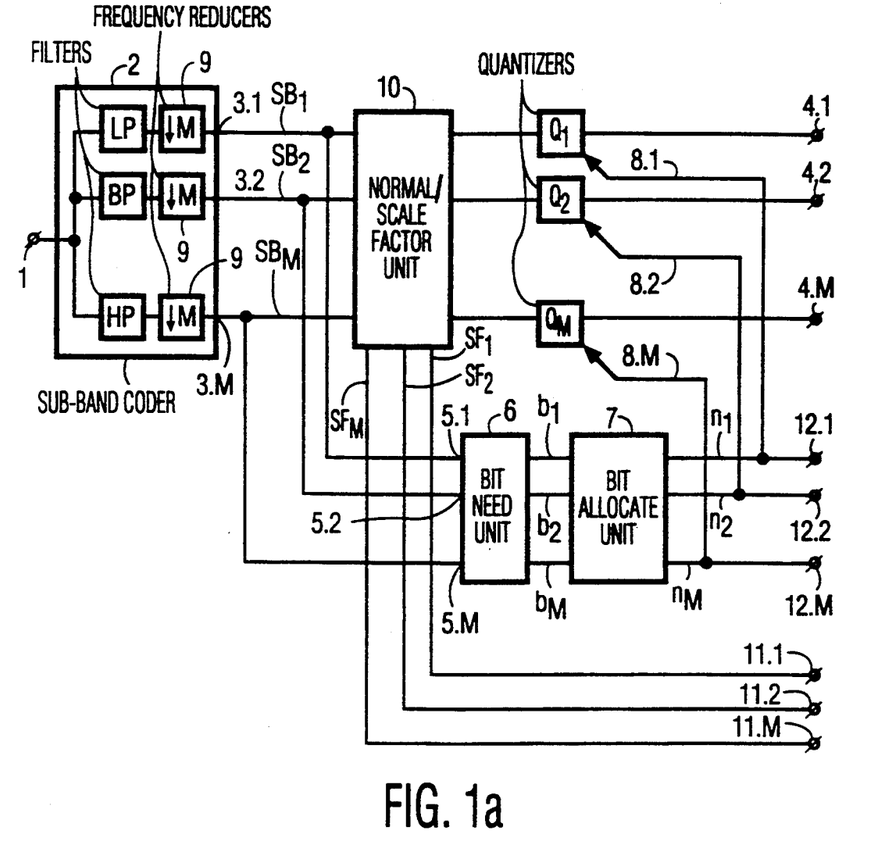

FIG. 1a shows a first conversion unit of a prior art recording apparatus. An input terminal 1 is supplied with a wide-band digital signal. The wide-band digital signal may be an audio signal having a bandwidth of, for example, about 20 kHz. The audio signal may be a stereo audio signal. If it is, the discussion which follows is applicable primarily to only one of the two signal portions (i.e., the left signal portion or right signal portion) of the stereo audio signal. For example, input terminal 1 may be supplied with, for example, 16-bit samples of, for example, the left signal portion of the audio signal having, for example, a 44 kHz sample frequency. The other signal portion will then be subject to the same process.

The audio signal (if stereo, the left signal portion for example) is applied to a sub-band coder 2 comprising analysis filters. The sub-band coder 2 distributes the audio signal over M sub-bands by means of M filter, i.e., a low-pass filter LP, M-2 bandpass filters BP and a high-pass filter HP, resulting in M sub-band signals. M is equal to, for example, 32. The sample frequencies of the M sub-band signals are reduced in frequency reducers 9. In a frequency reducer 9, the sample frequency of a sub-band signal is reduced by a factor of M. The (reduced frequency) sub-band signals, thus, obtained are presented at the outputs 3.1, 3.2, ... 3.M. At the output 3.1 the sub-band signal $SB_1$ is available in the lowest sub-band $SB_1$. At the output 3.2 the sub-band signals $SB_2$ is available in the next to lowest sub-band. At the output 3.M the sub-band signal $SB_M$ is presented in the highest sub-band. The sub-band signals at the outputs 3.1 to 3.M have the form of successive samples expressed in 16-bit numbers or more, for example, 24-bit numbers.

In the present exemplary embodiment, the sub-bands 1 to M are all equally wide. However, this is not necessary. An article by M. A. Krasner, entitled "The Critical Band Coder ... Digital Encoding of Speech Signals Based on Perceptual Requirements of the Auditory System", in Vol. 1, IEEE ICASP 80, Apr. 8–11, 1980 at pp. 327–328, for example, proposes a subdivision into a plurality of sub-bands whose bandwidths approximately correspond to the bandwidths of the critical bands of the human auditory system in the respective frequency areas.

The operation of the sub-band coder 2 will not be explained further because the operation of a sub-band coder has already been extensively discussed in U.S. Pat. Nos. 4,896,362 and 5,214,678 and the above-mentioned Krasner article, which are all incorporated herein by reference.

The sub-band signals are each composed of consecutive signal blocks of q successive samples, for example, q may be equal to 12, and applied to associated quantizers $Q_1$ to $Q_M$. In a quantizer $Q_m$, the samples in a signal block are quantized to produce quantized samples, each having a number of bits $n_m$, which is smaller than 16.

FIG. 1a shows how each of the left sub-band signals (obtained from the left signal portion), in signal blocks of q successive samples, are applied to an associated quantizer $Q_m$. In a like manner, each of the right sub-band signals (obtained from the right symbol portion), in signal blocks of q successive samples, are applied to an associated quantizer (not shown). During the quantization process, the signal blocks (groups of q successive samples) of the sub-band signals are each quantized to a smaller number of bits. In addition, the q samples in each signal block are first normalized. This normalization is effected in a normalization/scale factor unit 10 by dividing the amplitudes of the q samples in a symbol block by the amplitude of the sample having the largest absolute value in that signal block. The amplitude of the sample having the largest amplitude in a signal block of a sub-band signal $SB_m$ produces a scale factor $SF_m$, see U.S. Pat. No. 5,323,396. Subsequently, the amplitudes of the normalized samples which are now situated in an amplitude range from $-1$ to $+1$, are quantized.

This quantization is discussed extensively in U.S. Pat. No. 5,323,396, See FIGS. 24, 25 and 26 of that application and the relevant description pertaining thereto. The quantized samples in the sub-band signals $SB_1$ to $SB_M$ are available at the respective outputs 4.1 to 4.M.

The outputs 3.1 to 3.M are also coupled to the respective inputs 5.1 to 5.M of a bit need determining unit 6. The bit need determining unit 6 determines for each of the time-equivalent q-sample signal blocks of the sub-band signals $SB_1$ to $SB_M$ a bit need $b_m$. The bit need $b_m$ is a relative number which bears a proportional relationship to the number of bits with which the q samples in a signal block of a sub-band signal should be quantized.

The bit needs $b_1$ to $b_M$ derived by the bit need determining unit 6 are applied to a bit allocation unit 7. The bit allocation unit 7 determines the actual number of bits $n_1$ to $n_M$ with which each of the q samples in the corresponding (time equivalent) signal blocks of the sub-band signals $SB_1$ to $SB_M$ are to be quantized on the basis of the bit needs $b_1$ to $b_M$. Control signals corresponding to the numbers $n_1$ to $n_M$ are applied to the respective quantizers $Q_1$ to $Q_M$ over the lines 8.1 to 8.M, so that the quantizers are capable of quantizing the samples with the correct number of bits.

U.S. Pat. Nos. 5,367,608 and 5,365,553, which are incorporated herein by reference, extensively discuss the operations of the bit need determiner unit 6 and the bit allocation unit 7.

The quantized samples in the signal blocks of the sub-band signals are thereafter applied to inputs 4.1 to 4.M of a combining unit 14. In a like manner, bit allocation information, formed generally from conversion of the numbers $n_1$ to $n_M$, is applied to inputs 12.1 to 12.M of the combining unit 14. In addition, scale factor information, formed generally from conversion of the scale factors $SF_1$ to $SF_M$, is applied to inputs 11.1 to 11.M of the combining unit 14. The signal obtained at an output 17 of the combining unit 14 is a second digital signal, whose format is shown in FIG. 2 and discussed below.

Figure 1B:
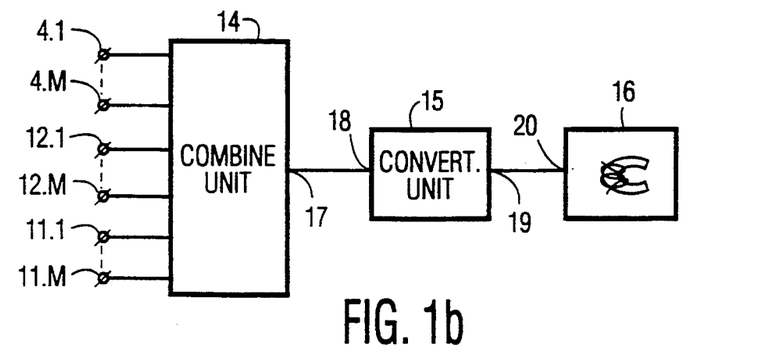

FIG. 1b shows another part of the recording apparatus, which includes the combining unit 14, a second conversion 15 and a write unit 16 for applying the signal presented at its input to a re-recordable record carrier. In this case, this record carrier is a magnetic record carrier.

In addition to the samples, the bit allocation information and the scale factor information for the left sub-band signals the samples, the bit allocation information and the scale factor information for the right sub-band signals are applied to the combining unit 14. The combining unit 14 combines the signals and accommodates them in successive frames of the second digital signal, which is available at its output 17.

Figure 2:
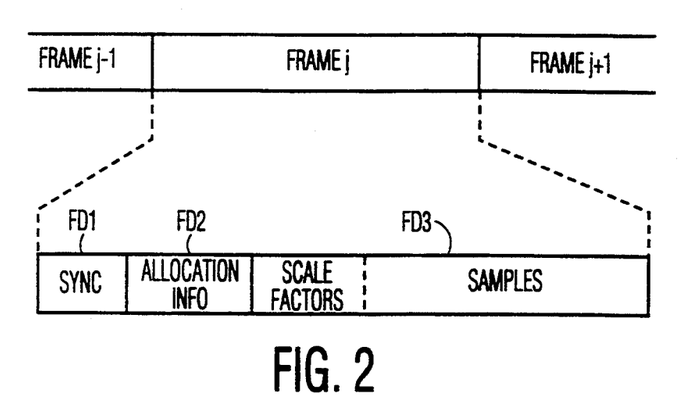
FIG. 2 shows the format of a second digital signal generated by a recording apparatus.

FIG. 2 shows the format of the second digital signal. This format is discussed extensively in U.S. Pat. No. 5,323,396. FIG. 2 shows the second digital signal comprising successive frames $j-1, j, j+1$ and the format of those frames. The frame j, for example, comprises a first frame portion FD1 in which sync information may be contained, a second frame portion FD2 in which the bit allocation information may be contained and a third frame portion FD3 in which the scale factor information followed by the quantized samples of the sub-band signals in the sub-bands may be contained. For a further description, reference is made to U.S. Pat. No. 5,323,396.

The second digital signal is applied to an input 18 of a second conversion unit 15. In second conversion unit 15, the second digital signal is error correction encoded. For this purpose, for example, the second digital signal is Reed solomon encoded and, possibly, interleaved. In addition, the second digital signal is encoded in such a way that the information therein is suitable for recording on a record carrier. Therefore, for example, an 8-to-10 encoder can be used for converting 8-bit words making up the second digital signal into 10 bit words. Such an 8-to-10 conversion is described, for example, in U.S. Pat. No. 4,620,311. During this conversion, the 8-bit information words are converted to 10-bit codewords. The results of the second conversion unit 15 is a third digital signal available at an output 19 thereof. The output 19 is coupled to an input 20 of a write unit 16 for writing the third digital signal in a track on a magnetic record carrier.

Figure 3:
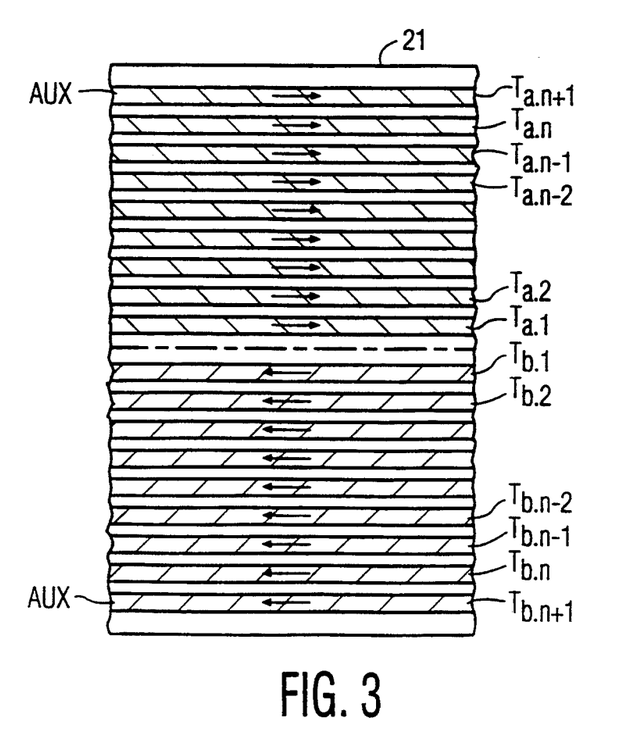
FIG. 3 shows the format of the tracks on a record carrier.

FIG. 3 shows a magnetic record carrier 21 having tracks. On the A side of the record carrier 21, there are $n+1$ tracks $T_{a.1}$ to $T_{a.n+1}$ which are parallel with each other and run in the longitudinal direction on the record carrier 21. The B side of the record carrier 21 likewise has $n+1$ tracks $T_{b.1}$ to $T_{b.n+1}$ which are parallel and run in the longitudinal direction.

The tracks $T_{a.n+1}$ and $T_{a.n+1}$ are auxiliary tracks in which an auxiliary signal is recorded, as described in U.S. Pat. No. 5,117,313, which is incorporated herein by reference. Digitized and encoded audio information is recorded, together with synchronization and system information at the tracks $T_{a.1}$ to $T_{a.n}$ and $T_{b.1}$ to $T_{b.n}$ on the record carrier 21. The audio information is included in frames in the tracks. These frames are all of substantially the same length.

Figure 4A:
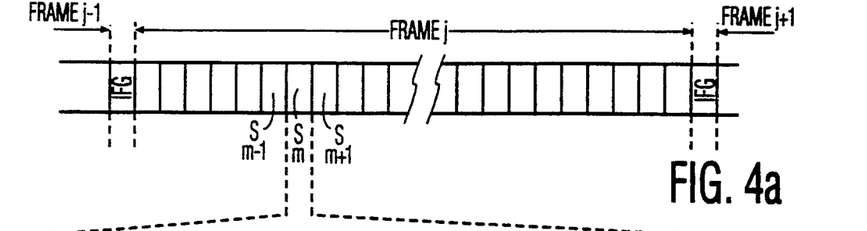
FIG. 4 shows the format of third digital signal generated by a recording apparatus as it is recorded in tracks on a record carrier.

FIG. 4a shows a track $T_{a.i}$ and the structure of the frames in that track. The other tracks of the record carrier 21 are structured in similar fashion. The format of the track $T_{a.i}$ is extensively described in U.S. Pat. No. 5,243,470, which is incorporated herein by reference. The track $T_{a.i}$ has consecutive frames . . . , $j-1, j, j+1$, . . . which are interrupted by interframe gaps IFG. The interframe gaps are extensively described in U.S. Pat. No. 5,267,098, which is incorporated herein by reference.

Figure 4B:
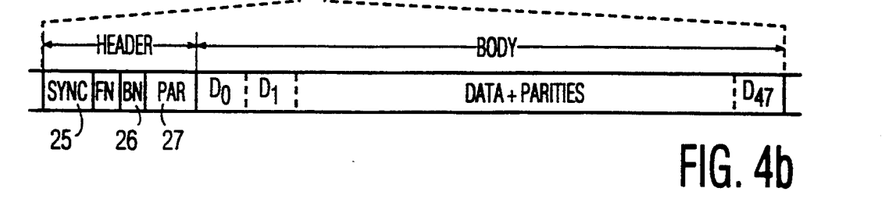

A frame comprises a number of information blocks . . . , $S_{m-1}, S_m, S_{m+1}, \ldots$ In the present example, the frames each comprise 32 information blocks. FIG. 4b shows the contents of a block, such as the block $S_m$. Each block has a first block section (hereinafter referred to as the header) and a second block section (hereinafter referred to as the body). The header comprises a sync word 25, a frame number FN, a block number BN and a parity word PAR. The body contains digital information representing the recorded audio signal (i.e., the audio information) and parity information. The body contains 48 bytes of 10 bits each. For a further explanation reference be made to U.S. Pat. No. 5,243,470.

Figure 5:
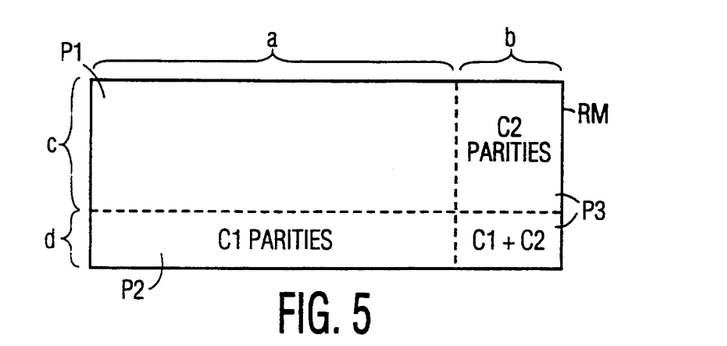
FIG. 5 shows a RAM memory included in a conversion unit for carrying out error correction coding in a recording apparatus.

A further explanation will now be given on how the second digital signal, having a serial data stream, is converted into the third digital which is recorded in tracks of the record carrier 21. The audio information included in the serial data stream of the second digital signal is divided in bytes of 8 bits long, and is stored, after interleaving, if needed, in a RAM memory RM, see FIG. 5, included in the second conversion unit 15 of FIG. 1b. More specifically, the RAM memory RM is capable of storing the audio information included in about 21 and ⅓ frames of the second digital signal in a part P1 of the RAM. In total, a number of a.c. of bytes of the second digital signal are stored in the a columns and c rows contained in the part P1 of the RAM. A $C_1$ error correction coding step is carried out column-wise over the a rows in the RAM so as to obtain a number of d parity bytes for each column. Those parity bytes are stored in a part P2 of the RAM. Next a $C_2$ error correction coding step is carried out row-wise over the $c+d$ rows in the RAM so as to obtain a number of b parity bytes for each column. Those parity bytes are stored in a part P3 of the RAM. Next, the RAM is read-out row-wise, and applied to an 8-to-10 encoder. $C+d$ equals a number n, which is the number of tracks on the record carrier in which the third digital signal is to be recorded. The $a+b$ bytes in a row are encoded and recorded in a corresponding track. The information included in each of the $c+d$ rows of the RAM could be encoded by a number of $c+d$ corresponding 8-to-10 encoders, one for each of the rows. Another possibility is that the information in the $c+d$ rows are encoded by time-multiplexing by one single 8-to-10 encoder. In that last case, care should be taken that the correct running DSV is used for the encoding of the information that should be recorded in one track. The encoded $a+b$ bytes of 10 bits are each recorded in the body of the track frames on the record carrier. Further, the header-information is added to the information recorded. The n track frames that adjoin each other in the n tracks $T_{a.1}$ $T_{a.n}$ form a tape frame.

Figure 6:
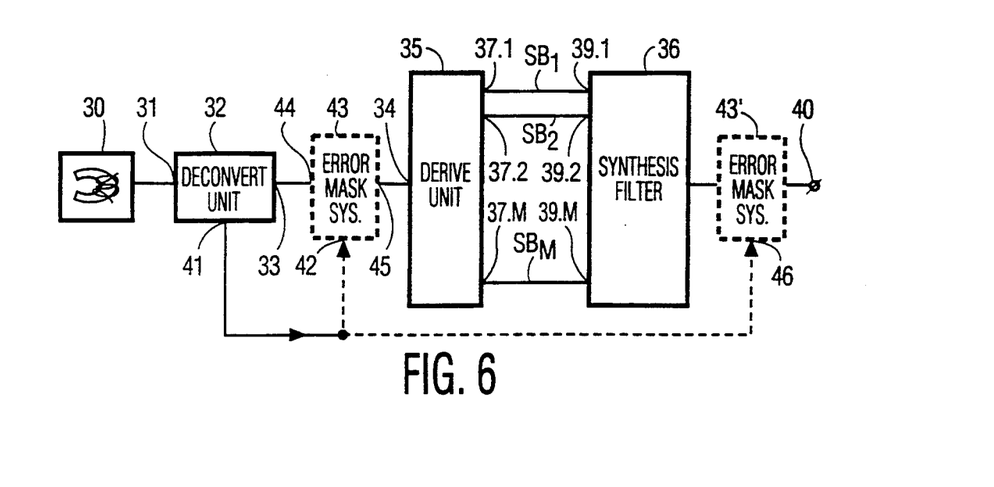
FIG. 6 shows a prior art reproducing apparatus.

FIG. 6 shows in a diagram an embodiment of a prior art reproducing apparatus. The reproducing apparatus comprises a read unit 30 for reading from the tracks on the record carrier 21a replicated third digital signal substantially corresponding to the third digital signal.

The replicated third digital signal is applied to an input 31 of a first deconversion unit 32. In the first deconversion unit 32, first a 10-to-8 conversion is performed in a manner which is inverse to that used in the 8-to-10 conversion described above. Then an error correction operation is carried out and possibly de-interleaving of the information in that signal occurs. The first deconversion unit 32 outputs a replicated second digital signal which substantially corresponds to the second digital signal (represented in FIG. 2) at an output 33. The replicated second digital signal is applied to an input 34 of a second deconversion unit, which comprises a derivation unit 35 and a synthesis filter unit 36. The derivation unit 35 derives from the frames shown in FIG. 2, the allocation information, the scale factor information and the quantized samples in each signal block in each sub-band signal. After dequantization of the quantized samples and multiplication by the appropriate scale factors to obtain samples, i.e., replicated samples substantially corresponding to the original samples in the signal blocks of the sub-band signals, replicas of the left sub-band signals $SB_1$ to $SB_M$ appear at outputs 37.1 to 37.M. These sub-band signals are applied to inputs 39.1 to 39.M of synthesis filter unit 36 which constructs a replica of the original left signal portion from these sub-band signals. The operation of the synthesis filter unit 36 is extensively discussed in U.S. Pat. No. 5,214,678. The replica of the original left signal portion is applied by the synthesis filter 36 to an output 40 of the reproducing apparatus. The derivation unit 35 has M additional outputs at which replicas of the right sub-band signals are available. A synthesis filter unit (not shown), that of synthesis such as filter unit 36, is available for reconstructing a replica of the original right signal portion from those sub-band signals.

Errors detected in the incoming information in the replicated third digital signal can be corrected in the first deconversion unit 32. If an error turns out not to be uncorrectable, the first deconversion unit 32 will generate an error flag at an output 41. This error flag is applied to a control signal input 42 of a concealment unit which can take the form of an error masking system, for example.

Error masking can be realized in various ways.

As a first possibility, an erroneous sample can be replaced by a correct previous sample. A second possibility is that an interpolation is carried out between two correct samples adjoining the erroneous sample on each side. If a number of consecutive error flags occur, a muting of the audio information is required. This can be realized by setting a number of samples to a zero value.

The error masking system may be arranged between the first deconversion unit 32 and the derivation unit 35, as is shown in FIG. 6 by means of block 43 represented in dashed lines. Error masking in response to error flags produced by the first deconversion unit 32 is then performed on the replicated second digital signal. The moment an error flag is generated indicates to the error masking system 43 which information word in the serial data stream of the second digital signal of FIG. 2 is erroneous.

Another option is to perform error masking by muting the audio signal (i.e., a replica of the original audio signal encoded by the recording apparatus) as it is supplied at the output 40. This implies that the error flags are to be applied to a control signal input 46 of an error masking system 43', indicated in FIG. 6 by dashed lines, which is coupled between the output of the synthesis filter unit 36 and the output 40.

What is described hereinafter is what happens when a new recording is made over an earlier recording.

Figure 7A:
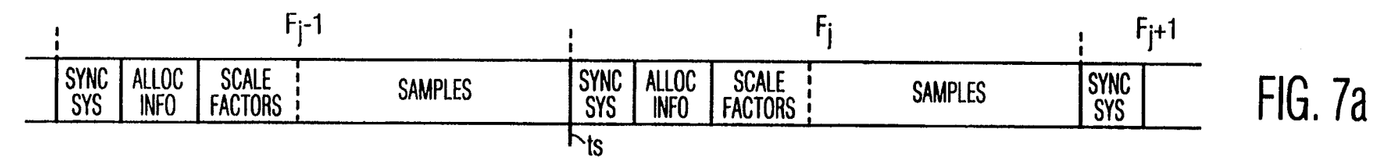
FIGS. 7a–c show a replicated second digital signal as it is read out, in the case of read-out of an original recording (FIG. 7a), and in the case of a new recording made partly over an original recording (FIGS. 7b and 7c)

FIG. 7a shows the serial data stream of the replicated second digital signal, as it is read out and converted in the first deconversion unit 32 of FIG. 6, assuming that no interruption of the original recording had taken place. Subsequent frames ..., $F_{j-1}$, $F_j$, $F_{j+1}$, ... follow each other and are supplied to the output 33 by the first deconversion unit 32.

Figure 7B:
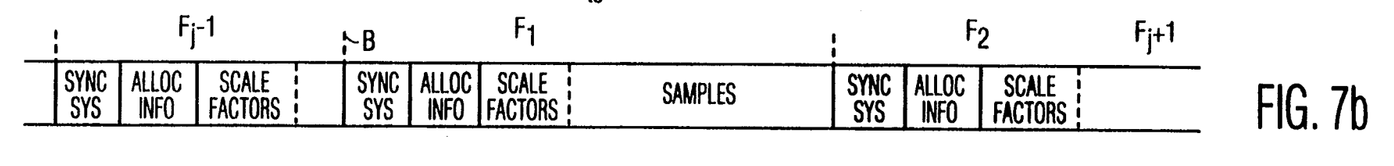

FIG. 7b shows the serial data stream of the replicated second digital signal at the output 33 in a case in which a new recording has been made over a terminal part of an original recording. The boundary, in the serial data stream of the replicated second digital signal, between the remaining portion of the original recording and the start position of the new recording is at the location indicated by B. The first frame $F_1$ in the serial data stream of the new recording begins before the frame $F_{j-1}$ of the original recording is terminated. Conversion of the replicated second digital signal into the replicated samples of the replicas of the sub-band signals is realized in the derivation unit 35 of FIG. 6 in conjunction with detecting the allocation information in the second frame portions FD2 and counting the bits in the portion of the third frame portion FD3 that comprises the quantized samples. In the same way, the quantized samples are retrieved from the third frame portion FD3 of the frame $F_{j-1}$.

During conversion of the replicated second digital signal shown in FIG. 7b into the replicated samples, the derivation unit 35 is not aware of the fact that the boundary B exists between the original recording and the new recording, and, as a result, it continues counting the bits in the serial data stream which are past the location B. This results in an erroneous conversion of the frame $F_{j-1}$ into replicated samples in the derivation unit 35, such that an audible distortion will occur in the portion of the audio signal derived therefrom and supplied at the output 40. At a time $t_s$, which is the start of the frame $F_j$ of the original recording, the derivation unit 35 expects to receive a new sync signal. Because no such sync signal is detected, it waits until the next sync signal, which is the sync signal of the frame F2 of the new recording, is detected. Hence, the audible distortion lasts at least during the occurrence of the frames $F_{j-1}$ and $F_1$. Proper conversion could then be resumed by converting the information contained in frame F2. If the derivation unit 35 requires at least two sync signals lying at the correct distance in time from each other, conversion is resumed at a later time interval, e.g., after having received the at least two frames (e.g. F2 and F3).

Figure 7C:
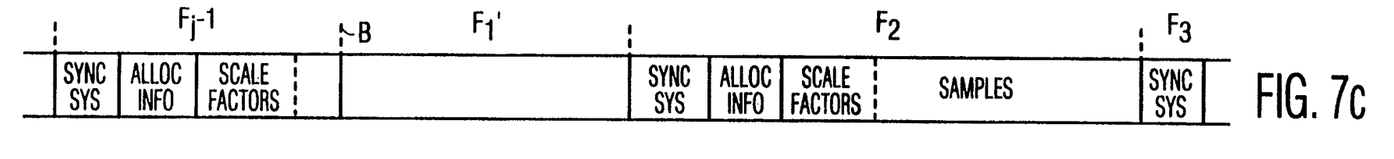

FIG. 7c shows another situation where an original recording is partly overwritten by a new recording. It should be noted that the beginning of the new recording need not begin exactly with a complete frame, such as the frame $F_1$ in FIG. 7b. FIG. 7c shows that the new recording starts with an incomplete frame $F_1'$. The reason for this is that the first conversion unit, comprising the elements 2, 10 and 14 discussed above, and the second conversion unit 15 are only loosely synchronized. This means that during recording the start of the encoding of the second digital signal in the second conversion unit 15 need not exactly coincide with the start of a frame in the second digital signal. As a result, during reproduction, the derivation unit 35 continues counting the bits in the serial data stream past the location B without noticing the boundary between the original and the new recordings. Hence, an audible distortion occurs, which distortion again lasts at least from the start of the frame $F_{j-1}$ until the information in the frame F2 has been received. (The time interval corresponding to that period is hereinafter referred to as the first specific time interval.)

Figure 8:
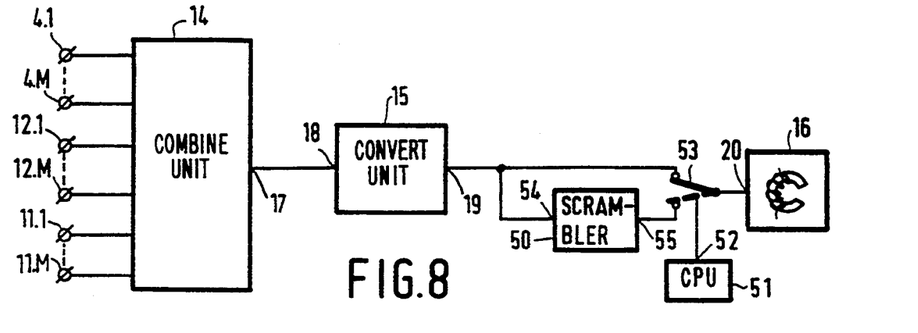
FIG. 8 shows an embodiment of a part of a recording apparatus in accordance with the invention.

FIG. 8 shows that part of a first embodiment of a recording apparatus incorporating the invention. Specifically FIG. 8 shows the second part of the recording apparatus of FIG. 1b further including a signal processing unit, in the form of a scrambler 50, having an input 54 coupled to the output 19 of the second conversion unit 15. The scrambler 50 scrambles the third digital signal during the first specific time interval in response to the switching of the recording apparatus into a recording mode. That switching (into the recording mode) is activated by a user pushing a recording button (not shown). A central processing unit 51 detects the actuation of the record button and generates a switching control signal at an output 52 thereof which is applied to a controllable switch 53. The switch 53 is positioned in the down position under the influence of the control signal so as to couple an output 55 of the scrambler 50 to the input 20 of the writing unit 16. As a result, the information included in a start portion of the third digital signal to be recorded in the track is mutilated. More particularly, the information included in the start portion is mutilated such that, during reproduction, the application of the mutilated information included in the start portion read from the track (which is included in the replicated third digital signal) to the first deconversion unit 32 of FIG. 6 results in the first deconversion unit 32 generating error flags at its output 41 so as to cause the audio signal derived in part therefrom to be muted during the above-mentioned first specific time interval. As a result, no audible distortion occurs in the audio signal produced at the output 40 of the reproducing apparatus. From what has been said previously with respect to FIGS. 7b and 7c, the muting of the audio signal should at least cover the time interval in which the information corresponding to the erroneously decoded frames $F_{j-1}$ and $F_1$ in the replicated second digital signal is supplied to the output 40 of the synthesis filter 36 of FIG. 6.

Preferably, only the information contained in the body portion of one or a number of consecutive track frames is scrambled, while the information contained in the header portion of a track frame remains unaffected.

This makes it possible to maintain synchronization during read out.

Figure 9:
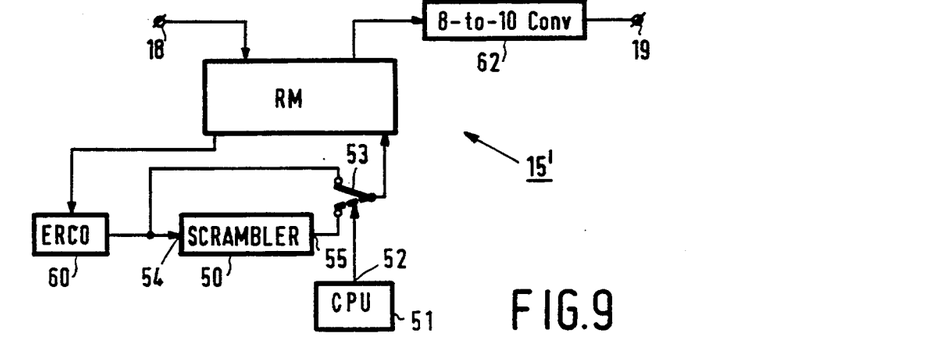
FIG. 9 shows another embodiment of a part of a recording apparatus in accordance the invention.

In a second embodiment of the recording arrangement in accordance with the invention, parity information which is added to the above-described audio information in the second conversion unit 15, is mutilated, or scrambled. FIG. 9 shows a further detailed embodiment of the second conversion unit, denoted therein by the reference numeral 15'. The second conversion unit 15' comprises a parity generator in the form of an error correction coding unit ERCO 60 having an input coupled to an output of a RAM memory RM and an output coupled to a terminal of a switch 53 and to an input of a scrambler 50. An output of the scrambler 50 is coupled to a second terminal of the switch 53. A third common terminal of the switch 50 is coupled to an input of the memory RM. The parity generator 60 generates the $C_1$ and $C_2$ parity codewords as a result of the audio information included in the part P1 of the memory RM, which audio information was applied to its input. With the switch 53 in the position as shown in FIG. 9, the generator 60 supplies the parity information to the memory RM for storing the $C_1$ codewords in the part P2 and the $C_2$ parity words in the part P3 of the memory RM.

The central processing unit 51 detects the actuation of the record button and generates a switching control signal at an output 52, which switching control signal is applied to the controllable switch 53. The switch 53 is positioned in the down position under the influence of the control signal so as to couple the output 55 of the scrambler 50 to the input of the memory RM. All of the parity information included in the parts P2 and P3 of the memory RM is then scrambled. As a result, during reproduction error flags are generated and a muting of the audio signal during a first time interval that equals the time interval corresponding to the length of time of the audio information included in a tape frame.

Another possibility is to inhibit the calculation of the parity information for the parts P2 and P3 of the memory RM. Inhibiting the calculation of the parity information for the audio information included in the part P1 of the memory RM means that the parts P2 and P3 in the memory RM will still comprise the parity information corresponding to the audio information that was previously stored in the part P1. This parity information has no relation to the audio information newly stored in the part P1. Thus, during reproduction, error flags will again generate, leading to a muting of the audio signal.

Moreover, not all of the parity information in the parts P2 and P3 of the memory RM need to be scrambled. It is sufficient to scramble, or mutilate, so many parity codewords in the parts P1 and P2 that a sufficient length of audio information, covering the transition between the two recordings, is muted during reproduction.

A further possibility is to scramble a sufficient part of the audio information included in the part P1 so that a sufficient number of error flags will be generated during reproduction to result in a muting of the audio signal.

In still another embodiment, the recording apparatus is adapted to insert one or more concealment codes in the signal to be recorded, such that those one or more concealment codes can be detected during reproduction. Upon detection of one or more concealment codes, the concealment unit 43 or 43' mutes the replicated second or audio signal during the first specific time interval.

Figure 10:
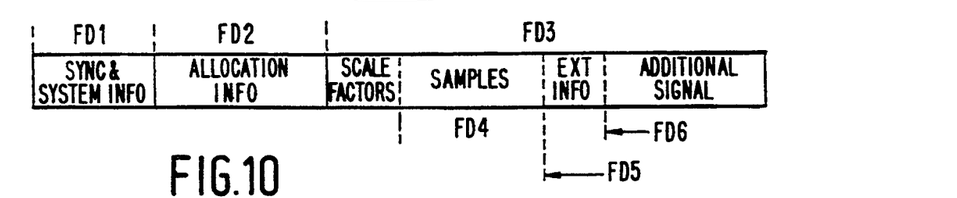
FIG. 10 shows another format of a second digital signal generated by a recording apparatus.

FIG. 10 shows a frame of the second digital signal generated by the combining unit 14 of FIG. 1b. The third frame portion FD3 is now further divided so as to include a fifth frame portion FD5 behind the portion of the frame, i.e., frame portion FD4, comprising the quantized samples. The format of that frame has been described extensively with reference to FIG. 23 in U.S. Pat. No. 5,323,396. A concealment code can now be inserted in the fifth frame portion FD5 of the frame, more specifically in a sixth frame portion FD6 thereafter. Another possibility is to insert a concealment code in the system information (SYS INFO) in the first frame portion FD1 of the frame.

A concealment code can be in the form of one bit which is located at a fixed location in the frame. If the bit is logical '1', this can mean that the concealment code is present. A bit with logical '0' can mean that no concealment code is present.

In the case that a concealment code is inserted in the sixth frame portion FD6 of a frame as is shown in FIG. 9, i.e., at the end of the frame, it would suffice to include the concealment code in the first frame $F_1$ or $F_1'$, see FIGS. 7b or 7c, respectively, of the new recording. Preferably, a concealment code is inserted in a number of frames of the second digital signal by the combining unit 14 so that during reproduction at least the frame $F_1$ or $F_1'$, see FIGS. 7b and 7c, respectively, contains a concealment code.

In the case that a concealment code is inserted in the first frame part FD1, it is necessary to insert a concealment code in at least the first two frames $F_1$ and $F_2$ of the new recording, so that, in the case of the situation described with reference to FIG. 7c, a concealment code can be detected during reproduction.

Figure 11:
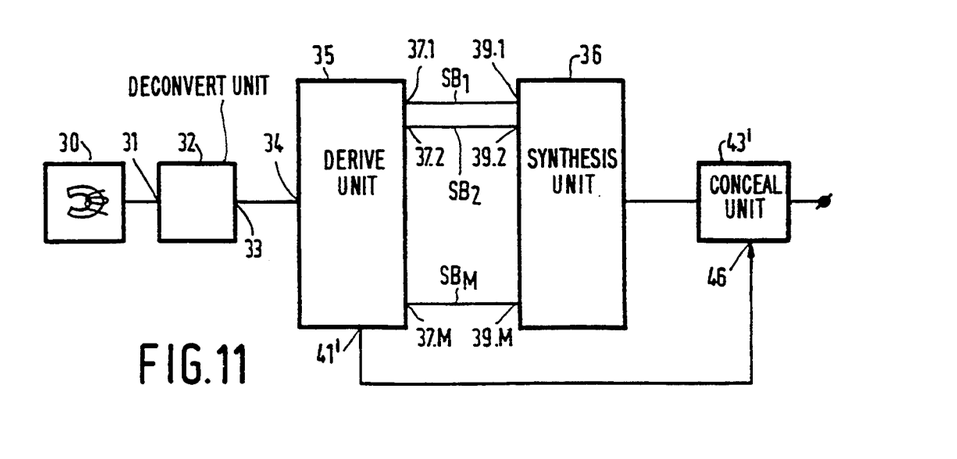
FIG. 11 shows an embodiment of a reproducing apparatus in accordance with the invention.

Again it should be noted that, in order to conceal the distortion, the specific first time interval during which concealing takes place should cover at least the time interval during which the information corresponding to the incorrectly decoded frames $F_{j-1}$ and $F_1$ or $F_1'$ is supplied to the output of the synthesis filter 36, see FIG. 11.

FIG. 11 shows an embodiment of the reproducing apparatus which is capable of detecting the concealment codes so as to activate the concealment function during the specific first time interval. The derivation unit 35, which receives a replicated second digital signal including frames, such as the frame of FIG. 10, is capable of detecting a concealment code. Upon detection of a concealment code, the synthesis filter 35 generates a concealment control signal at an output 41', which concealment control signal is applied to the control input 46 of the concealment unit 43', so as to conceal the audio signal during the first specific time interval.

Concealing the audio signal can, as shown by FIG. 11, mean a muting of the audio signal. Another possibility is that the frame $F_{j-2}$, the last correctly decoded frame, is repeated, or that an interpolation is carried out.

What is described hereinafter is what happens at the end of a new recording. More specifically, what happens in the situation where a terminal portion of the original recording is not overwritten by the new recording and, thus, is still present at the end of the new recording on the record carrier.

Figure 12A:
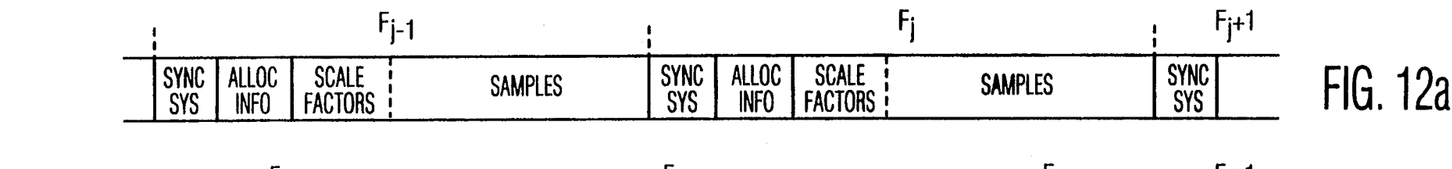
FIGS. 12a–c show a replicated second digital signal as it is read out, in the case of the read-out of an original recording (FIG. 12a), and in the case of a new recording made partly over an original recording (FIGS. 12b and 12c)
Figure 12B:
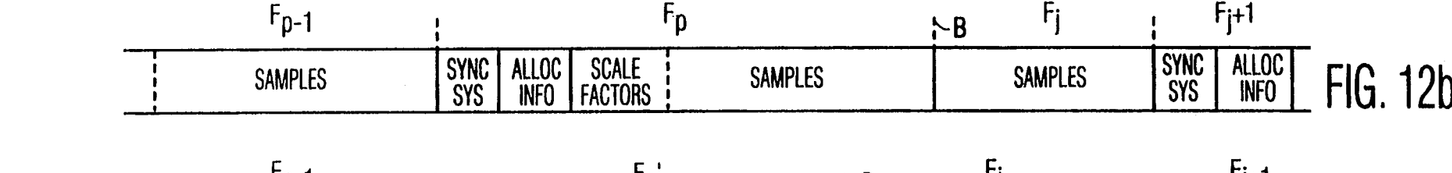
Figure 12C:
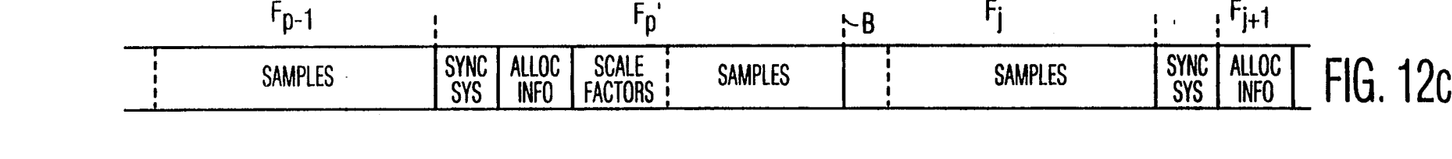

FIG. 12a shows the replicated second digital signal generated at the output 33 of the first deconversion unit 32 of FIG. 6 when reproducing the original recording. FIG. 12a is the same as FIG. 7a. FIGS. 12b and 12c show situations where the original recording has been partly overwritten so that a boundary B exists between the terminal part of the new recording and the remaining part of the original recording. In FIG. 12b, the new recording ends with a complete frame $F_p$. In FIG. 12c, the new recording ends with an incomplete frame $F_p'$.

In order to preclude the occurrence of disturbances in the audio signal produced at the output of the synthesis filter unit 36 of FIG. 6 as a result of the presence of the boundary B, one of the measures described above can be applied at the termination of the new recording, in response to the user activating a 'record stop' button on the recording apparatus. As a result, a concealment function is activated during a specific second time interval so as to conceal the audio signal during reproduction past the boundary B. The second specific time interval should at least cover the time interval in which the portion of the audio signal derived from the information corresponding with the incorrectly decoded frames $F_p'$ and $F_j$, see FIG. 12c is supplied to the output of the synthesis filter 36. The length of the specific first time interval can be equal to the second specific time interval.

In addition to the measures described above, it is advisable to start the new recording with an audio signal of very low (e.g., zero) level, and to fade the audio signal in to the required level. In the same way, it is advisable to terminate the new recording with an audio level that is faded out to a zero level.

Figure 13:
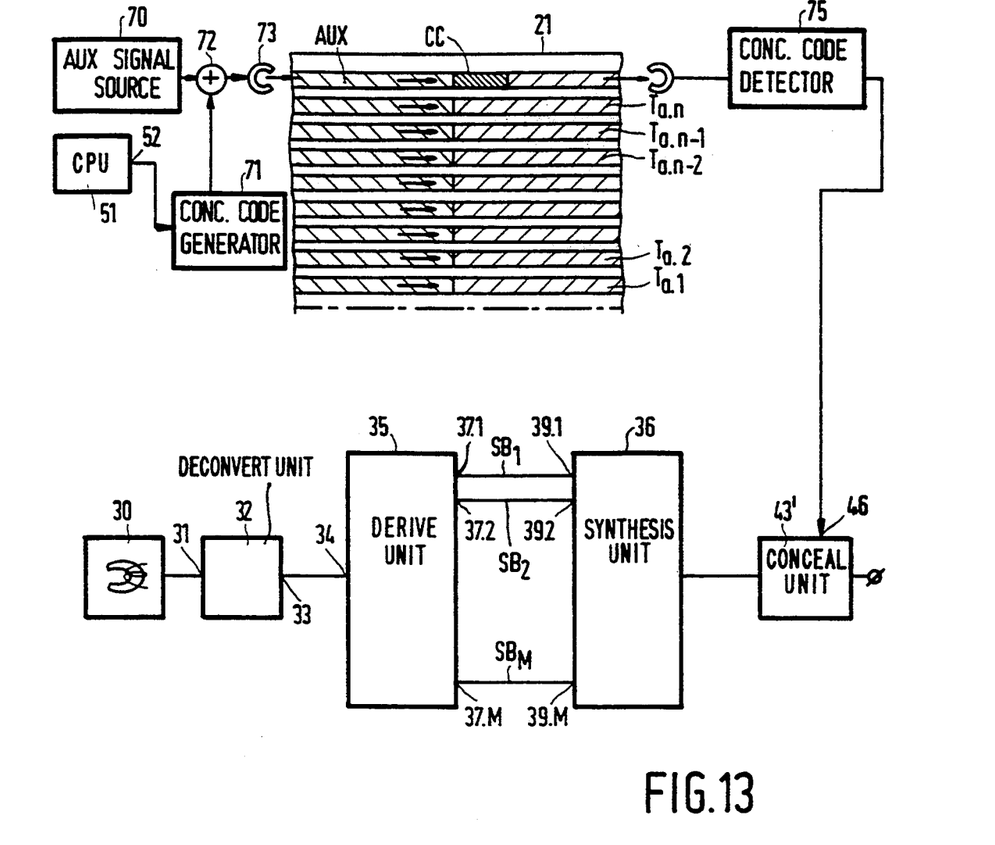
FIGS. 13 and 14 show embodiments in which a concealment code is recorded in a separate track on a record carrier.

A further embodiment of the invention is shown in FIG. 13. That embodiment shows the recording of a concealment code CC in the auxiliary track $T_{a.n+1}$ of the record carrier 21. The recording apparatus comprises an auxiliary signal source 70 for generating the auxiliary signal. The auxiliary signal includes table of contents (TOC) information, such as the sequence numbers of the (musical) items and position information relating to the start positions of the (musical) items recorded on the record carrier. The position information can be in the form of timing information. The auxiliary information is supplied to a first input of a signal combination unit 72, which has an output coupled to a read head 73. The recording apparatus further comprises a concealment code generator 71 which generates a concealment code CC under the influence of a control signal supplied by the central processing unit 51 via its output 52 to the generator 71. The control signal at the output 52 is generated in response to the recording apparatus being switched into the recording mode. The switching into the recording mode is detected by the central processing unit 51. The concealment code is supplied to a second input of the combination unit 72. The head 73 records the auxiliary signal and the concealment code (if present) in the AUX track $T_{a.n+1}$.

FIG. 13 also shows the top half of the record carrier 21. The original recording is indicated by the portions of the tracks being hatched by lines from top left to bottom right. The portions of the tracks being hatched from top left to bottom right and from top right to bottom left indicate the new recording. Clearly visible is the concealment code, indicated by the black spot cc, which is located in the start portion of the new recording of the auxiliary signal.

FIG. 13 further shows a reproducing apparatus which includes a concealment code detector 75. During reproduction, the detector 75 detects the concealment code and generates the concealment control signal which is supplied to a control signal input 46 of the error concealment unit 43'.

Figure 14:
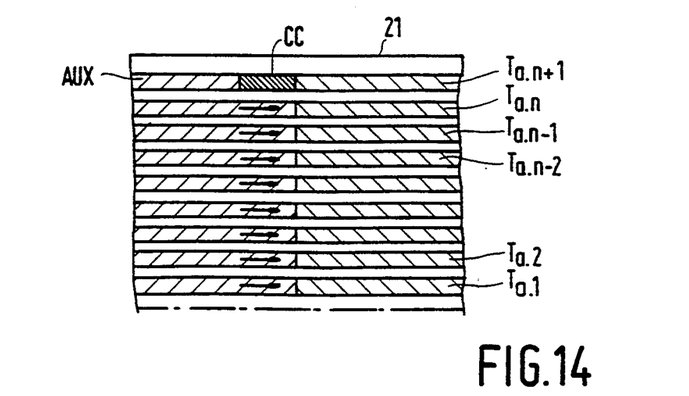

FIG. 14 shows the recording of a concealment code CC on the terminal part of the aux track $T_{a.n+1}$ in response to the termination of the recording mode over a previous recording. Again, the portions of the tracks being hatched by lines from top left to bottom right indicate the original recording. The portions of the tracks being hatched from top left to bottom right and from top right to bottom left indicate the new recording. Clearly visible is the concealment code, indicated by the black spot CC, which is located in the terminal portion of the new recording of the auxiliary signal.

We claim:

1. A system for recording and reproducing digital signals on and from a re-recordable record carrier, the system comprising:

a recording apparatus including:
first conversion means for (a) receiving a digital audio signal, and (b) converting the digital audio signal into a second digital signal having audio information and synchronization information included in successive frames of the second digital signal, the audio information including bit-reduced quantized samples of sub-band signals derived from sub-band coding the digital audio signal, and bit allocation information and scale factor information relating to the quantized samples;
second conversion means for converting the second digital signal into a third digital signal which is error correction encoded;
signal processing means for ensuring that a portion of the third digital signal includes mutilated information therein; and
write means for writing the third digital signal in at least one track on the record carrier; and a reproducing apparatus including:
read means for reading a replicated third digital signal which substantially corresponds to the third digital signal from the at least one track on the record carrier;
first deconversion means for (a) correcting errors in the replicated third digital signal, (b) generating a concealment control signal if it is incapable of correcting an error in the replicated third digital signal, and (c) converting the replicated third digital signal into a replicated second digital signal which substantially corresponds to the second digital signal;
second deconversion means for converting the replicated second digital signal into a replica of the digital audio signal; and
concealment means for concealing one or more errors not corrected by said first deconversion means in response to one or more concealment control signals generated by said first conversion means;
wherein, during reproduction, the mutilated information included in a portion of the replicated third digital signal, substantially corresponding to the portion of the third digital signal having the mutilated information, results in said first deconversion means generating one or more concealment control signals during a time interval so as to cause a portion of the replica of the digital audio signal to be concealed during the time interval.

2. The system as claimed in claim 1, wherein the time interval lasts at least as long as the portion of the replica of the digital audio signal which is to be concealed.

3. The system as claimed in claim 2, wherein said signal processing means mutilates the third digital signal, in response to said recording apparatus being switched into a recording mode, so as to provide the mutilated information in a start portion of the third digital signal, which, in turn, causes the mutilated information to be included in a start portion of the replicated third digital signal; and the time interval lasts at least as long as a start portion of the replica of the digital audio signal derived from the start portion of the replicated third digital signal.

4. The system as claimed in claim 2, wherein said signal processing means mutilates the third digital signal, in response to and directly preceding termination of a recording mode, so as to provide the mutilated information in a terminal portion of the third digital signal, which, in turn, causes the mutilated information to be included in a terminal portion of the replicated third digital signal; and the time interval lasts at least as long as a terminal portion of the replica of the digital audio signal derived from the terminal portion of the replicated third digital signal.

5. A system for recording and reproducing digital signals on and from a re-recordable record carrier, the system comprising:
   a recording apparatus including:
     first conversion means for (a) receiving a digital audio signal, and (b) converting the digital audio signal into a second digital signal having audio information and synchronization information included in successive frames of the second digital signal, the audio information including bit-reduced quantized samples of sub-band signals derived from sub-band coding the digital audio signal, and bit allocation information and scale factor information relating to the quantized samples;
     second conversion means for converting the second digital signal into a third digital signal which is encoded for writing on the record carrier;
     signal processing means for ensuring that a concealment code is included in a portion of the third digital signal; and
     write means for writing the third digital signal in at least one track on the record carrier; and
   a reproducing apparatus including:
     read means for reading a replicated third digital signal which substantially corresponds to the third digital signal from the at least one track on the record carrier, a portion of the replicated third digital signal, which substantially corresponds to the portion of the third digital signal including the concealment code, also including the concealment code;
     first deconversion means for converting the replicated third digital signal into a replicated second digital signal which substantially corresponds to the second digital signal;
     second deconversion means for converting the replicated second digital signal into a replica of the digital audio signal;
     detector means for (a) detecting the concealment code, and (b) generating a concealment control signal during a time interval in response to detection of the concealment code; and
     concealment means for concealing a portion of the replica of the digital audio signal in response to the concealment control signal during the time interval.

6. The system as claimed in claim 5, wherein the time interval lasts at least as long as the portion of the replica of the digital audio signal which is to be concealed.

7. The system as claimed in claim 6, wherein said signal processing means adds the concealment code to a start portion of the third digital signal, in response to said recording apparatus being switched into a recording mode, which, in turn, causes the concealment code to be included in a start portion of the replicated third digital signal; and the time interval lasts at least as long as a start portion of the replica of the digital audio signal derived from the start portion of the replicated third digital signal.

8. The system as claimed in claim 6, wherein said signal processing means adds the concealment code to a terminal portion of the third digital signal, in response to and directly preceding termination of a recording mode, which, in turn, causes the concealment code to be included in a terminal portion of the replicated third digital signal; and the time interval lasts at least as long as a terminal portion of the replica of the digital audio signal derived from the terminal portion of the replicated third digital signal.

9. A system for recording and reproducing digital signals on and from a re-recordable record carrier, the system comprising:
   a recording apparatus including:
     first conversion means for (a) receiving a digital audio signal, and (b) converting the digital audio signal into a second digital signal having audio information and synchronization information included in successive frames of the second digital signal, the audio information including bit-reduced quantized samples of sub-band signals derived from sub-band coding the digital audio signal, and bit allocation information and scale factor information relating to the quantized samples;
     second conversion means for converting the second digital signal into a third digital signal which is encoded for writing on the record carrier;
     signal source means for generating an auxiliary signal;
     signal processing means for adding a concealment code to the auxiliary signal;
     write means for writing (a) the third digital signal in at least one track on the record carrier and (b) the auxiliary signal in an auxiliary track on the record carrier;
   a reproducing apparatus including:
     read means for reading (a) a replicated third digital signal which substantially corresponds to the third digital signal from the at least one track on the record carrier, and (b) a replicated auxiliary signal which substantially corresponds to the auxiliary signal from the auxiliary track on the record carrier, the replicated auxiliary signal including the concealment code;
     first deconversion means for converting the replicated third digital signal into a replicated second digital signal which substantially corresponds to the second digital signal;
     second deconversion means for converting the replicated second digital signal into a replica of the digital audio signal;

detector means for (a) detecting the concealment code in the replicated auxiliary signal, and (b) generating a concealment control signal during a time interval in response to detection of the concealment code; and concealment means for concealing a portion of the replica of the digital audio signal in response to the concealment control signal during the time interval.

10. The system as claimed in claim 9, wherein the time interval lasts at least as long as the portion of the replica of the digital audio signal which is to be concealed.

11. The system as claimed in claim 10, wherein said signal processing means adds the concealment code to the auxiliary signal in response to said recording apparatus being switched into a recording mode; said concealment means conceals a start portion of the replica of the digital audio signal in response to the concealment control signal; and the time interval lasts at least as long as the start portion of the replica of the digital audio signal.

12. The system as claimed in claim 10, wherein said signal processing means adds the concealment code to the auxiliary signal in response to and directly preceding termination of a recording mode; said concealment means conceals a terminal portion of the replica of the digital audio signal in response to the concealment control signal; and the time interval lasts at least as long as the start portion of the replica of the digital audio signal.

13. A recording apparatus, comprising:
first conversion means for (a) receiving a digital audio signal, and (b) converting the digital audio signal into a second digital signal having audio information and synchronization information included in successive frames of the second digital signal, the audio information including bit-reduced quantized samples of sub-band signals derived from sub-band coding the digital audio signal, and bit allocation information and scale factor information relating to the quantized samples;

second conversion means for converting the second digital signal into a third digital signal which is error correction encoded;

signal processing means for ensuring that a portion of the third digital signal includes mutilated information therein; and write means for writing the third digital signal in at least one track on a re-recordable record carrier;

wherein the mutilated information indicates that a portion of a replica of the digital audio signal, which is derived from the third digital signal written on the record carrier, is to be concealed during its reproduction.

14. The recording apparatus as claimed in claim 13, wherein said signal processing means ensures that the mutilated information is included in the portion of the third digital signal by scrambling at least a part of that portion.

15. The recording apparatus claimed in claim 13, wherein, in response to the recording apparatus being switched into a recording mode, said signal processing means ensures that the mutilated information is included in a start portion of the third digital signal.

16. The recording apparatus as claimed in claim 15, wherein the mutilated information indicates that a start portion of the replica of the digital audio signal is to be concealed.

17. The recording apparatus as claimed in claim 15, wherein said signal processing means scrambles at least a part of the start portion.

18. The recording apparatus claimed in claim 13, wherein, in response to and directly preceding termination of a recording mode, said signal processing means ensures that the mutilated information is included in a terminal portion of the third digital signal.

19. The recording apparatus as claimed in claim 18, wherein the mutilated information indicates that a terminal portion of the replica of the digital audio signal is to be concealed.

20. The recording apparatus as claimed in claim 18, wherein said signal processing means scrambles at least a part of the terminal portion.

21. The recording apparatus as claimed in claim 13, wherein said second conversion means is adapted to add parity information to the third digital signal, including in the portion of the third digital signal which is to include the mutilated information; and said signal processing means is adapted to ensure that the mutilated information is included in the portion of the third digital signal by mutilating the parity information included in that portion of the third digital signal.

22. The recording apparatus as claimed in claim 21, wherein said signal processing means mutilates the parity information included in a start portion of the third digital signal.

23. The recording apparatus as claimed in claim 21, wherein said signal processing means mutilates the parity information included in a terminal portion of the third digital signal.

24. A recording apparatus, comprising:
first conversion means for (a) receiving a digital audio signal, and (b) converting the digital audio signal into a second digital signal having audio information and synchronization information included in successive frames of the second digital signal, the audio information including bit-reduced quantized samples of sub-band signals derived from sub-band coding the digital audio signal, and bit allocation information and scale factor information relating to the quantized samples;

second conversion means for converting the second digital signal into a third digital signal which is encoded for writing on a re-recordable record carrier;

signal processing means for ensuring that a concealment code is included in a portion of the third digital signal; and write means for writing the third digital signal in at least one track on the record carrier;

wherein the concealment code indicates that a portion of a replica of the digital audio signal, which is derived from the third digital signal written on the record carrier, is to be concealed during its reproduction.

25. The recording apparatus as claimed in claim 24, wherein said signal processing means ensures that the concealment code is included in a start portion of the third digital signal.

26. The recording apparatus as claimed in claim 24, wherein said signal processing means ensures that the concealment code is included in a terminal portion of the third digital signal.

27. The recording apparatus as claimed in claim 24, wherein said signal processing means adds the concealment code to a portion of the second digital signal which, in turn, ensures that the concealment code is included in the portion of the third digital signal which is to include the concealment code, the portion of the third digital signal having the concealment code being derived from the portion of the second digital signal having the concealment code; and the concealment code indicates that the portion of the replica of the digital audio signal which is to be concealed, during its reproduction, is a portion which is derived from the portion of the third digital signal having the concealment code.

28. The recording apparatus as claimed in claim 27, wherein said signal processing means adds the concealment code to a start portion of the second digital signal in response to the recording apparatus being switched into a recording mode, which, in turn, results in the third digital signal having the concealment code in a start portion of the third digital signal; and the concealment code indicates that a start portion of the replica of the digital audio signal is to be concealed during reproduction of the replica of the digital audio signal.

29. The recording apparatus as claimed in claim 27, wherein said signal processing means adds the concealment code to a terminal portion of the second digital signal in response to and directly preceding termination of a recording mode, which, in turn, results in the third digital signal having the concealment code in a terminal portion of the third digital signal; and the concealment code indicates that a terminal portion of the replica of the digital audio signal is to be concealed during reproduction of the replica of the digital audio signal.

30. A recording apparatus, comprising:
first conversion means for (a) receiving a digital audio signal, and (b) converting the digital audio signal into a second digital signal having audio information and synchronization information included in successive frames of the second digital signal, the audio information including bit-reduced quantized samples of sub-band signals derived from sub-band coding the digital audio signal, and bit allocation information and scale factor information relating thereto;
second conversion means for converting the second digital signal into a third digital signal which is encoded for writing on a re-recordable record carrier;
signal source means for generating an auxiliary signal;
signal processing means for adding a concealment code to the auxiliary signal;
write means for writing (a) the third digital signal in at least one track on the record carrier and (b) the auxiliary signal in an auxiliary track on the record carrier;
wherein the concealment code indicates that a portion of a replica of the digital audio signal, which is derived from the third digital signal written on the record carrier, is to be concealed during its reproduction.

31. The recording apparatus as claimed in claim 30, wherein the concealment code indicates that a start portion of the replica of the third digital signal is to be concealed.

32. The recording apparatus as claimed in claim 31, wherein said signal processing means adds the concealment code to the auxiliary signal in response to the recording apparatus being switched into a recording mode.

33. The recording apparatus as claimed in claim 30, wherein the concealment code indicates that a terminal portion of the replica of the third digital signal is to be concealed.

34. The recording apparatus as claimed in claim 33, wherein said signal processing means adds the concealment code to the auxiliary signal in response to and directly preceding termination of a recording mode.

35. A reproducing apparatus, comprising:
receiving means for receiving from a re-recordable record carrier a first digital signal, representing a digital audio signal, which was encoded to include audio information, synchronization information and a concealment code in a portion of the first digital signal, the audio information including bit-reduced quantized samples of sub-band signals derived from sub-band coding the digital audio signal, and bit allocation information and scale factor information relating to the quantized samples;
deconversion means for converting the first digital signal into a replica of the digital audio signal;
detector means for (a) detecting the concealment code, and (b) generating a concealment control signal in response to detection of the concealment code; and
concealment means for concealing a portion of the replica of the digital audio signal in response to the concealment control signal.

36. The reproducing apparatus as claimed in claim 35, wherein the concealment code is included in a start portion of the first digital signal.

37. The reproducing apparatus as claimed in claim 36, wherein said concealment means conceals at least a start portion of the replica of the digital audio signal derived from the start portion of the first digital signal.

38. The reproducing apparatus as claimed in claim 35, wherein the concealment code is included in a terminal portion of the first digital signal.

39. The reproducing apparatus as claimed in claim 38, wherein said concealment means conceals at least a terminal portion of the replica of the digital audio signal derived from the terminal portion of the first digital signal.

40. A reproducing apparatus, comprising:
receiving means for receiving from a re-recordable record carrier (a) a first digital signal, representing a digital audio signal, which was encoded to include audio information and synchronization information, the audio information including bit-reduced quantized samples of sub-band signals derived from sub-band coding the digital audio signal, and bit allocation information and scale factor information relating to the quantized samples, and (b) an auxiliary signal having a concealment code;
deconversion means for converting the first digital signal into a replica of the digital audio signal;
detector means for (a) detecting the concealment code in the auxiliary signal, and (b) generating a concealment control signal in response to detection of the concealment code; and
concealment means for concealing a portion the replica of the digital audio signal in response to the concealment control signal.

41. The reproducing apparatus as claimed in claim 40, wherein said concealment means conceals at least a start portion of the replica of the digital audio signal.

42. The reproducing apparatus as claimed in claim 40, wherein said concealment means conceals at least a terminal portion of the replica of the digital audio signal.

43. A recording method, comprising:
converting a digital audio signal into a second digital signal having audio information and synchronization information included in successive frames of the second digital signal, the audio information including bit-reduced quantized samples of sub-band signals derived from sub-band coding the digital audio signal, and bit allocation information and scale factor information relating to the quantized samples;
converting the second digital signal into a third digital signal which is error correction encoded;
ensuring that a portion of the third digital signal includes mutilated information therein; and
writing the third digital signal in at least one track on a re-recordable record carrier;
wherein the mutilated information indicates that a portion of a replica of the digital audio signal, which is derived from the third digital signal written on the record carrier, is to be concealed during its reproduction.

44. A re-recordable record carrier produced in accordance with the method claimed in claim 43.

45. The record carrier claimed in claim 44, wherein the mutilated information is included in a start portion of the third digital signal.

46. The record carrier claimed in claim 44, wherein the mutilated information is included in a terminal portion of the third digital signal.

47. A recording method, comprising:
converting a digital audio signal into a second digital signal having audio information and synchronization information included in successive frames of the second digital signal, the audio information including bit-reduced quantized samples of sub-band signals derived from sub-band coding the digital audio signal, and bit allocation information and scale factor information relating to the quantized samples;
converting the second digital signal into a third digital signal which is encoded for writing on a re-recordable record carrier;
ensuring that a concealment code is included in a portion of the third digital signal; and
writing the third digital signal in at least one track on the record carrier;
wherein the concealment code indicates that a portion of a replica of the digital audio signal, which is derived from the third digital signal written on the record carrier, is to be concealed during its reproduction.

48. A re-recordable record carrier produced in accordance with the method claimed in claim 47.

49. The record carrier claimed in claim 48, wherein the mutilated information is included in a start portion of the third digital signal.

50. The record carrier claimed in claim 48, wherein the mutilated information is included in a terminal portion of the third digital signal.

51. A recording method, comprising:
converting a digital audio signal into a second digital signal having audio information and synchronization information included in successive frames thereof, the audio information including bit-reduced quantized samples of sub-band signals derived from sub-band coding the digital audio signal, and bit allocation information and scale factor information relating to the quantized samples;
converting the second digital signal into a third digital signal which is encoded for writing on a re-recordable record carrier;
producing an auxiliary signal having a concealment code therein; and
writing (a) the third digital signal in at least one track on the record carrier and (b) the auxiliary signal in an auxiliary track on the record carrier;
wherein the concealment code indicates that a portion of a replica of the digital audio signal, derived from the third digital signal written on the record carrier, is to be concealed during its reproduction.

52. A re-recordable record carrier produced in accordance with the method claimed in claim 51.

* * * * *